United States Patent [19]
Harrington, Jr.

[11] 3,800,398
[45] Apr. 2, 1974

[54] METHOD OF FABRICATING MULTIPLE-PLY BELLOWS

[76] Inventor: Edward F. Harrington, Jr., 2154 Emerson Ave., Louisville, Ky. 40205

[22] Filed: Dec. 14, 1972

[21] Appl. No.: 315,259

[52] U.S. Cl. ............... 29/423, 29/454, 29/455, 29/426, 29/471.1
[51] Int. Cl. ............................. B23p 17/00
[58] Field of Search.... 29/471.1, 471.3, 426, 401 R, 29/481, 482, 454, 423, 455

[56] References Cited
UNITED STATES PATENTS
2,797,112  6/1957  Ziebold ..................... 29/454 X
3,550,253  12/1970  Frey ......................... 29/471.1

Primary Examiner—Richard B. Lazarus
Attorney, Agent, or Firm—N. M. Esser

[57] ABSTRACT

In the fabrication of a bellows having concentric radially spaced inner and outer plies from a bellows having concentric inner, intermediate, and outer plies, the plies are sectioned into longitudinal sections, the sections of the intermediate ply are removed from between the sections of the inner and outer plies, and the sections of the inner and outer plies respectively are welded together to reform the inner and outer plies.

4 Claims, 5 Drawing Figures

PATENTED APR 2 1974　　　　　　　　　　　　　　　　　　3,800,398

METHOD OF FABRICATING MULTIPLE-PLY BELLOWS

BACKGROUND OF THE INVENTION

This invention pertains to a multiple-ply bellows of the type in which the space between adjacent plies may be maintained at a controlled pressure and monitored to detect pressure change indicative of a leak in either ply. Prior examples of such bellows are described in U.S. Pat. Nos. 2,125,447, 3,183,022, 3,299,417, 3,472,062, and 3,655,224.

The above-mentioned patents describe various expedients to provide radial spacing between adjacent plies of a multiple-ply bellows. As one example, U.S. Pat. No. 3,183,022 describes a thin foil layer to be inserted between the plies to act as a cushion and improve the resistance of the outer ply to breaks caused by mechanical action. As another example, U.S. Pat. No. 3,299,417 describes a two-ply bellows initially having an intermediate layer of "a low-melting ductile alloy" to be caused to melt and flow out after the bellows has been formed with suitable convolutions. Several examples of fluid-pervious meshwork to be employed as a permanent intermediate layer between adjacent plies of a multiple-ply bellows are described in U.S. Pat. Nos. 2,125,447, 3,299,417, and 3,655,224.

SUMMARY OF THE INVENTION

One object of this invention is to provide a new and improved method of fabricating a bellows having concentric radially spaced inner and outer plies. Another object of this invention is to provide a new and improved method of fabricating such a bellows from a bellows having concentric inner, intermediate, and outer plies.

Broadly, these objects may be attained by sectioning at least one of the inner and outer plies into cylindrical sections, whereby the sections and the intermediate ply readily may be removed, removing the intermediate ply, and welding the sections together to reform the inner and outer plies. When suitably positioned, the inner and outer plies are radially spaced approximately by the thickness of the intermediate ply.

Preferably, the inner, intermediate, and outer plies are sectioned into cylindrical sections, whereupon, after the sections of the intermediate ply are removed from between the sections of the inner and outer plies, the sections of the inner and outer plies respectively are welded together to reform the inner and outer plies.

These and other objects, features, and advantages of this invention will be evident from the following detailed description, with the aid of the accompanying drawing, of a preferred mode of carrying out this invention.

DETAILED DESCRIPTION OF PREFERRED MODE

Figure 1:
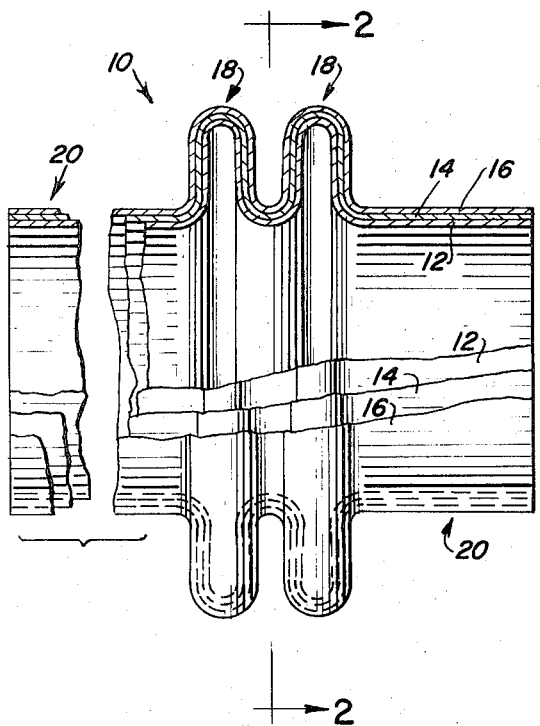
FIG. 1 is a longitudinal sectional view of a three-ply bellows from which a bellows having concentric radially spaced inner and outer plies can be fabricated.
Figure 2:
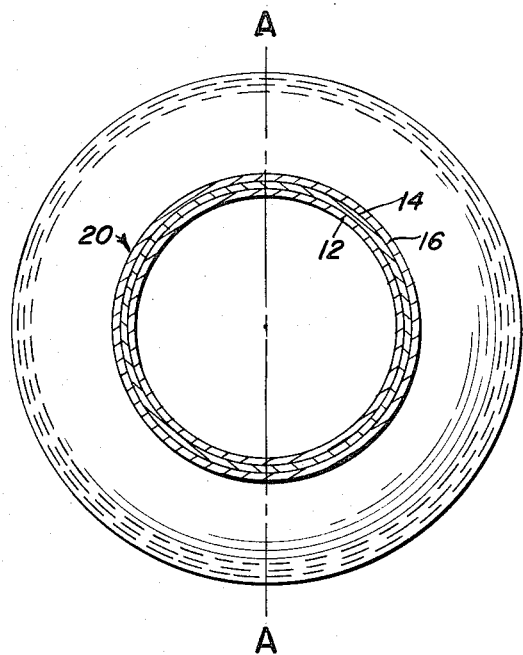
FIG. 2 is a diametrical sectional view taken substantially along line 2—2 of FIG. 1.

FIGS. 1 and 2 illustrate a bellows 10 having concentric inner, intermediate, and outer plies, 12, 14 and 16 respectively. Each ply of the bellows 10 comprises one or more circumferential convolutions 18, two being shown between opposite tubular end portions 20 commonly called "tangent ends." The convolutions 18 of the respective plies are in radial registry and in closely interfitting nested relationship with each other. For the purposes of this invention, the bellows 10 may be formed, as from three concentric nested tubes, by any suitable hydraulic or mechanical means known to the art.

Preferably, the plies 12 and 16 are made of metal tubing. This invention contemplates the use of various materials including wire mesh, metal tubing, polyethylene sheeting or tubing, etc., for an intermediate ply.

For the purposes of this invention, the intermediate ply 14 is removed from between the inner ply 12 and the outer ply 16, after at least one of the inner and outer plies has been sectioned into cylindrical sections. Preferably, the intermediate ply 14 is removed from between the inner ply 12 and the outer ply 16 after the plies 12, 14, and 16 are sectioned, as by longitudinal cuts in the diametrical plane A—A of FIG. 2, into cylindrical halves, each half approximating 180° arc at opposite ends. Thus, the halves of the intermediate ply 14 readily can be removed from between corresponding halves of the inner and outer plies. For some purposes contemplated by this invention, the plies 12, 14, and 16 may be sectioned into longitudinal sections other than cylindrical halves, as where cylindrical quarters are to be used as corner pieces for a generally rectangular bellows having generally planar convoluted sides.

After the removal of the intermediate ply 14 from between the inner ply 12 and the outer ply 16, appropriate cylindrical sections are welded together to reform these inner and outer plies. Where such removal has been accomplished by sectioning the plies 12, 14, and 16 into cylindrical halves, the halves of the inner ply 12 initially are welded together along longitudinal seams 22 (FIG. 3) to reform the inner ply 12, and the cylindrical halves of the outer ply 16 subsequently are welded together along longitudinal seams 24 (FIG. 3) to reform the outer ply 16.

Figure 3:
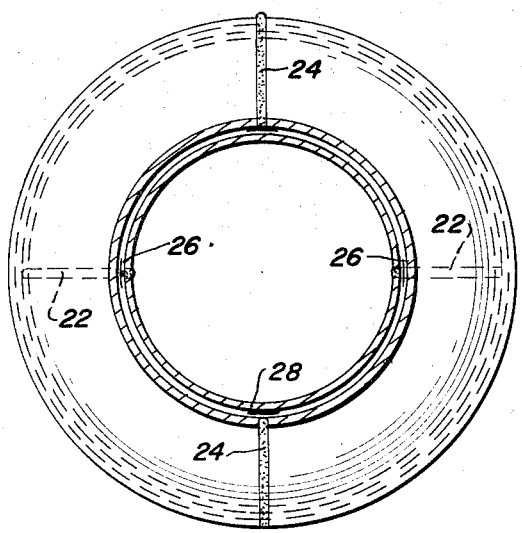
FIG. 3 is a view, analogous to FIG. 2, of a bellows having radially spaced inner and outer plies, as fabricated from the bellows of FIGS. 1 and 2.
Figure 4:
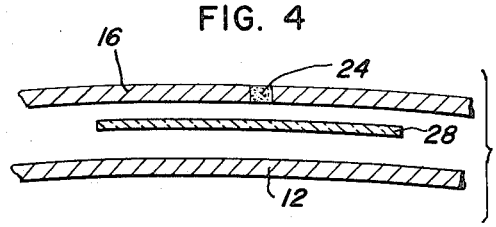
FIG. 4 is an enlarged fragmentary detail of a seam of the bellows of FIG. 3.
Figure 5:
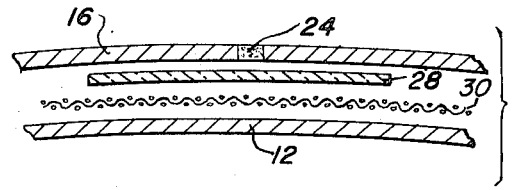
FIG. 5 is a detail, analogous to FIG. 4, of a modification of the bellows of FIG. 3.

As shown in FIG. 3, the seams 22 of the inner ply 12 and the seams 24 of the outer ply 16 may be displaced angularly, approximately 90° as shown, to avoid any interference between welding beads at the respective seams 22 and 24. As shown in FIGS. 3 and 4, similar strips 26 and 28 of a suitable backing material (cf. U.S. Pat. No. 2,916,001) may be applied to the underside of the respective seams 22 and 24 to be welded. As shown in FIG. 5, a strip 30 of fluid pervious woven wire meshwork may be inserted between the inner ply 12 and the strip 28. The strip 30 assures free flow of monitored fluid across the seam 22 within the space between the inner ply 12 and the outer ply 16.

When positioned in concentric relation to each other, the inner ply 12 and the outer ply 16 thus are radially spaced approximately by the thickness of the intermediate ply 14. Annular spacers (not shown) of comparable thickness may be inserted between the inner ply 12 and the outer ply 16 at the respective tangent ends 20 to maintain such spacing.

The space between the inner ply 12 and outer ply 16 may be sealed, as by circumferential weldments, at the respective tangent ends 20. Thus, as is known, such space may be maintained at a controlled pressure and monitored to detect pressure change indicative of a leak in either ply. Suitable fittings and other apparatus for these purposes are described in the above-mentioned patents.

I claim:

1. A method of fabricating an elongated bellows having a longitudinal axis and having concentric radially spaced inner and outer plies from a bellows having concentric inner, intermediate, and outer plies comprising the steps of sectioning at least one of said inner and outer plies into longitudinal sections, removing said intermediate ply from between said inner and outer plies, and welding said sections together to reform said inner and outer plies.

2. A method of fabricating an elongated bellows having a longitudinal axis and having concentric radially spaced inner and outer plies from a bellows having concentric inner, intermediate, and outer plies comprising the steps of sectioning said plies into longitudinal sections, removing the sections of said intermediate ply from between the sections of said inner and outer plies, and welding the sections of said inner and outer plies respectively together to reform said inner and outer plies.

3. The method of claim 2 wherein said sections are cylindrical halves.

4. The method of claim 2 wherein said plies are sectioned along section lines disposed in radial planes.

* * * * *